US012654513B2

(12) United States Patent
Wolfe et al.

(10) Patent No.: US 12,654,513 B2
(45) Date of Patent: Jun. 16, 2026

(54) AIR RECIRCULATION CONTROL SYSTEM EMPLOYING A MASS BALANCE FOR LIQUID MANAGEMENT

(71) Applicant: MAHLE INTERNATIONAL GMBH, Stuttgart (DE)

(72) Inventors: Edward Wolfe, Clarence Center, NY (US); George Melero, Buffalo, NY (US); Bailey Reid, Lockport, NY (US)

(73) Assignee: MAHLE International GmbH, Stuttgart (DE)

( * ) Notice: Subject to any disclaimer, the term of this patent is extended or adjusted under 35 U.S.C. 154(b) by 109 days.

(21) Appl. No.: 18/625,634

(22) Filed: Apr. 3, 2024

(65) Prior Publication Data
US 2025/0313061 A1     Oct. 9, 2025

(51) Int. Cl.
*B60H 1/00*          (2006.01)

(52) U.S. Cl.
CPC ..... *B60H 1/00785* (2013.01); *B60H 1/00828* (2013.01); *B60H 1/00835* (2013.01); *B60H 1/00864* (2013.01)

(58) Field of Classification Search
CPC ............ B60H 1/00742; B60H 1/00785; B60H 1/00828; B60H 1/00835; B60H 1/00849; B60H 1/00864
See application file for complete search history.

(56) References Cited

U.S. PATENT DOCUMENTS

| | | | | |
|---|---|---|---|---|
| 4,881,456 | A | * | 11/1989 | Yasuda .............. B60H 1/00742 |
| | | | | 165/41 |
| 5,307,644 | A | * | 5/1994 | Cummins .......... B60H 1/00828 |
| | | | | 62/133 |
| 7,214,911 | B2 | | 5/2007 | Kim et al. |
| 7,958,740 | B2 | | 6/2011 | Hirai et al. |
| 8,701,427 | B2 | | 4/2014 | Yelles |
| 8,733,428 | B2 | | 5/2014 | Nakajima |
| 9,475,361 | B2 | | 10/2016 | Arai et al. |
| 2002/0002833 | A1 | * | 1/2002 | Klapp .................... F24F 3/1411 |
| | | | | 62/203 |
| 2010/0163220 | A1 | * | 7/2010 | Nakajima .......... B60H 1/00785 |
| | | | | 62/159 |
| 2013/0030575 | A1 | * | 1/2013 | Dempsey ................. F24F 11/74 |
| | | | | 700/276 |
| 2015/0231947 | A1 | * | 8/2015 | Shmueli-Friedland ...................... |
| | | | | B60H 1/00742 |
| | | | | 165/202 |

FOREIGN PATENT DOCUMENTS

WO      WO-2025048053 A1 *  3/2025   .............. F24F 11/63

* cited by examiner

*Primary Examiner* — Jerry-Daryl Fletcher
*Assistant Examiner* — Daniel C Comings
(74) *Attorney, Agent, or Firm* — Barnes & Thornburg

(57)          ABSTRACT
A method of controlling air recirculation via a continuous-feedback loop control system that adjusts cabin air recirculation in vehicles based on a number of different sensor inputs. The system uses a mass balance on the interior passenger compartment of the vehicle to sense and adjust the amount of dissolved water vapor in the cabin for liquid management.

12 Claims, 8 Drawing Sheets

Modified Block 270 From
Previous "HVAC Blower Valve
Adjustment"

Modified Block 280 From Previous
"HVAC Blower Speed Adjustment"

660

680

670

650

AIR RECIRCULATION CONTROL SYSTEM EMPLOYING A MASS BALANCE FOR LIQUID MANAGEMENT

BACKGROUND OF THE INVENTION

Supplying warmer air from the cabin to a vehicle's heater reduces the energy needed for heating when compared to ambient external air, but it increases the risk of creating condensation on the windshield due to the higher moisture content of the cabin air. To enable energy savings by using recirculated air (warmer air from the cabin), the Heating, Ventilation, and Air Conditioning ("HVAC") system needs to be able to determine when condensation may occur and adjust the operation to prevent it.

This application relates to a continuous-feedback loop control system that adjusts cabin air recirculation in vehicles based on a number of different sensor inputs. The system uses a mass balance on the interior of the vehicle to monitor and reduce the amount of dissolved water vapor in the passenger cabin. The subject disclosure is related to systems to prevent condensation from forming on the interior of a window while simultaneously reducing battery usage to run the heating system and blower motor.

SUMMARY OF THE INVENTION

A first representative embodiment of the disclosure is provided. The representative embodiment includes an HVAC system for a vehicle with a first air input configured to receive air from a passenger compartment of a vehicle where the HVAC system is disposed, a second air input configured to receive air from outside of the vehicle, a fan with a suction that is configured to receive air from the first air input and the second air input, and a valve positioned upstream of the suction for the fan, the valve operable to allow either (i) air only from the first air input, (ii) air only from the second air input, or (iii) air from both the first air input and the second air input, wherein a position of the valve can be modified to alter relative percentages of air from the first and second inputs that reaches the suction of the fan, an air cooling device that air from a discharge of the fan can flow therepast, an air heating device that air from the discharge of the fan can flow therepast, and a plurality of air outlet flowpaths that direct air from the HVAC system to various specific locations within the vehicle; and a control module configured to control vehicle cabin humidity, the control module comprising:

at least one sensor that monitors for a parameter within a vehicle passenger compartment, or a parameter of an environment surrounding the vehicle passenger compartment, at least one valve upstream of the fan, and at least one control module, wherein the control module causes operation of the at least one actuator based upon an output of the at least one sensor.

Another representative embodiment includes a method for controlling vehicle cabin humidity, the method includes sensing at least one bulk property condition within a vehicle cabin, performing a mass balance based on the sensed bulk property condition within the vehicle cabin, in response to the mass balance, actuating at least one solenoid in a heating system to divert more air into the vehicle cabin, and optionally, in response to the mass balance, actuating at least one solenoid in a heating system to increase blower speed within the heating system of vehicle cabin.

Yet another representative embodiment includes a system for controlling cabin humidity. The system includes a first air input configured to receive air from a passenger compartment of a vehicle where the HVAC system is disposed, a second air input configured to receive air from outside of the vehicle, a fan with a suction that is configured to receive air from the first air input and the second air input, and a valve positioned upstream of the suction for the fan, the valve operable to allow either (i) air only from the first air input, (ii) air only from the second air input, or (iii) air from both the first air input and the second air input, wherein a position of the valve can be modified to alter relative percentages of air from the first and second inputs that reaches the suction of the fan, an air cooling device that air from a discharge of the fan can flow therepast, an air heating device that air from the discharge of the fan can flow therepast, and a plurality of air outlet flowpaths that direct air from the HVAC system to various specific locations within the vehicle; and a control module, wherein the control module performs the following: sensing at least one bulk property condition within a vehicle cabin, performing a mass balance based on the sensed bulk property condition within the vehicle cabin, in response to the mass balance, actuating a valve within the HVAC system to adjust an amount of air that is allowed to flow into the vehicle cabin, and optionally, in response to the mass balance, actuating increasing blower speed within the heating system of vehicle cabin.

Other representative embodiments are provided that are of the scope of the Numbered Paragraphs of the specification below.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
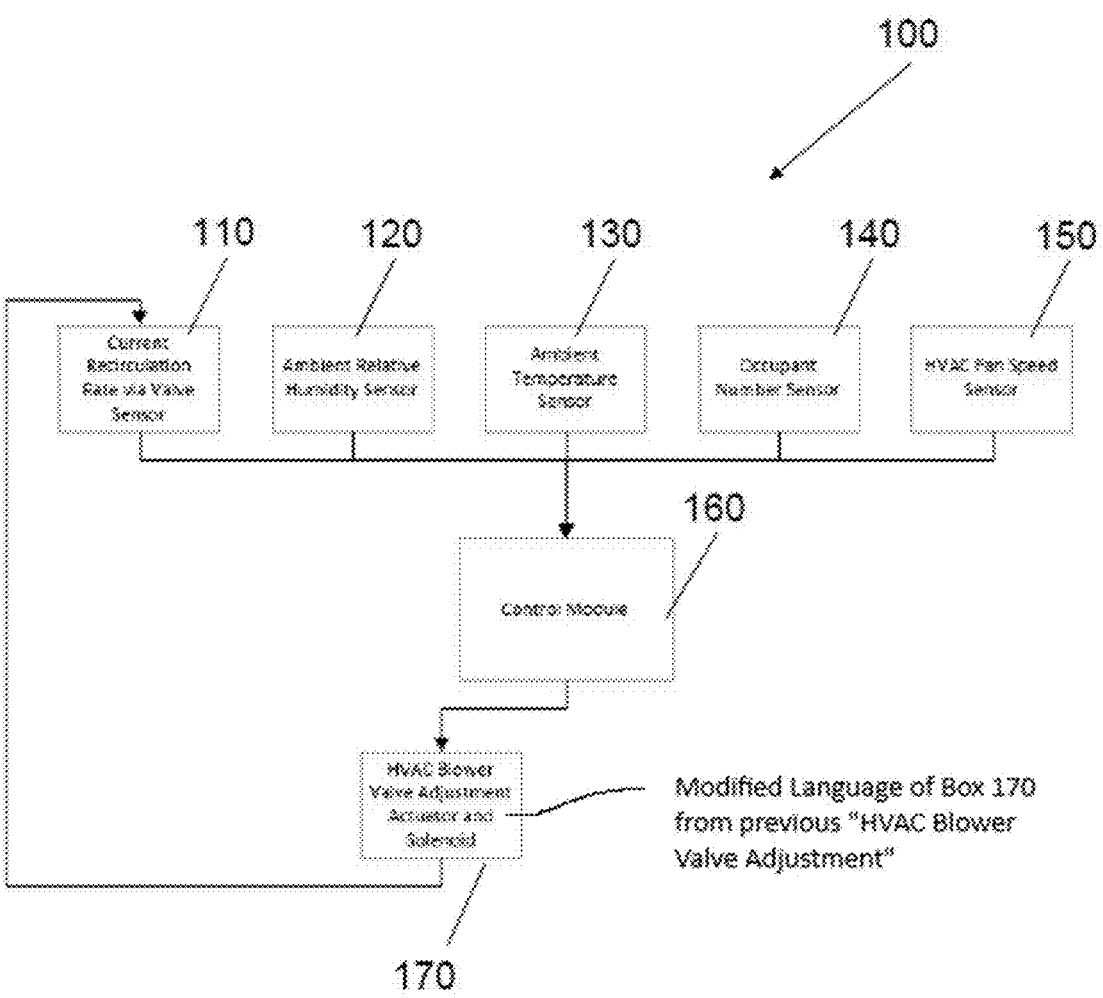
FIG. 1 is a diagrammatic view of a continuous feedback loop control system for adjusting air recirculation by adjusting the HVAC blower valve.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

The present disclosure relates to vehicle climate control systems, and more specifically relates to electric vehicle climate control systems. The embodiments discussed herein are intended to be provided is provided in conjunction with a climate control system which consists of a heating, ventilation, and air conditioning (HVAC) assembly. HVAC assemblies in vehicles typically include a number of fluid sources such as fresh air and cabin air via a recirculation system. HVAC assemblies also include a fan or blower which circulates the fresh air, cabin air, or a mixture of the two through the vehicle cabin. HVAC assemblies recirculation systems may include a valve upstream of the fan suction that can operate to control the air flow from the two fluid sources. HVAC assemblies importantly include a cooling system, a heating system, and various valves downstream of the heating and cooling systems to direct the flow of air within the cabin of the vehicle.

The cooling system generally includes an evaporator unit, a condenser unit, and a compressor as is known in the art. Additionally, it is known by a person of skill in the art that any number of alternative cooling systems may be useful including, but not limited to peltier devices, chillers, water heat exchangers, evaporative coolers, and the like.

The heating system may include a condenser within a heat pump system, or an electric resistive heater in electric vehicles or an engine heat exchanger in internal combustion vehicles. The fan or blower of the HVAC system flows air through either the condenser, the electric resistive heater or the heat exchanger, which in turn heats the air. The heated air is then circulated into the vehicle cabin via the HVAC assembly. It may be advantageous to use the valve upstream of the fan suction to recirculate some cabin air through the resistive heater or heat exchanger to reduce heating demands on the heating system which in turn reduces power consumption. Additionally, it is known by a person of skill in the art that any number of alternative heating systems may be useful, including, but not limited to, radiative heating systems, induction heating systems, exhaust heat exchangers, and the like.

The control system disclosed herein is used to control the operation of the valve upstream of the fan suction, and in some embodiments the fan blower speed, in an HVAC assembly, in order to optimize battery consumption while simultaneously eliminating the risk of condensation forming on interior surfaces of vehicle windows.

The flow path of air through a vehicle consists of a plurality of valves both upstream and downstream of the HVAC assembly, an intake for fresh air located outside of the vehicle cabin, and a plurality of vents located within the vehicle cabin. The plurality of valves upstream generally consists of an intake valve to control the amount of fresh air entering the HVAC system and a valve upstream of the fan suction to control the amount of air recirculated from the vehicle cabin. These valves control the inlet of both fresh air and cabin air to the HVAC assembly. The intake for fresh air generally consists of a port that allows fresh air to ultimately flow into the vehicle cabin. The plurality of vents within the cabin generally consists of a number of vents spaced across the interior of the vehicle which allow for the fan or blower to distribute air around the vehicle cabin, and may consist of vents located in the ceiling, located in the floor, located in the dashboard, located in the center console. These vents allow air to be distributed evenly through the vehicle and allow the water vapor level to remain constant in the interior of the vehicle.

The present disclosure generally relates a system and method for controlling condensation on the front windshield within a vehicle cabin while simultaneously optimizing battery life. The present invention utilizes sensors, which in some embodiments are already are installed in a vehicle such that no new sensors need to be installed. The control module uses the existing sensors in a continuous feedback loop to adjust the amount of recirculated air. This reduces the load on the batteries caused by heating and therefore improves range in electric vehicles or fuel mileage in internal combustion powered vehicles.

Turning first to FIG. 1, a diagrammatic view of a continuous feedback loop control system 100 for adjusting air recirculation by adjusting an HVAC blower valve is shown. The control system 100 has a number of integrated sensors. These sensors provide inputs to the control system 100 such that the control system 100 can calculate and adjust outputs to optimize battery consumption.

In some embodiments, there are numerous inputs to the control system 100 which are generated from sensors within a vehicle's cabin. The sensors in the vehicle's cabin may be pre-installed with other systems and equipment or may be purposely installed for use with the control system 100 disclosed herein. The sensors which provide inputs to the vehicle's control system 100 may be sensors configured to detect bulk properties of the air or the environment within the vehicle cabin. The first input may be the current recirculation rate of vehicle cabin air based on a valve (or flap or door) angle sensor 110. The valve angle sensor 110 determines the angle of a HVAC blower valve 620 in an HVAC system 600 that is upstream of the fan 610 (see FIG. 6). The HVAC blower valve 620 is adjustable between multiple positions, including: (i) completely allow air flow from the vehicle cabin (passenger compartment) to the fan and block fresh (external) air to the fan suction, (ii) completely allow fresh air to the fan suction and block air flow from the vehicle cabin, and (iii) allow air flow simultaneously from the vehicle cabin and fresh air, with the valve position adjustable to adjust the relative percentages of each air flow to the fan suction. The valve angle sensor 110 may determine how much cabin air is recirculated, by percent, and how much fresh air is added. Alternatively, the motor/actuator position itself may be determinative of the valve position (and therefore the type and percentage of flow from the various sources) without the need of a valve angle sensor. The second input to the control system 100 may be ambient relative humidity via an existing ambient relative humidity sensor 120 in the vehicle cabin HVAC system 600. The third input to the control system 100 may be ambient temperature from an ambient temperature sensor 130 located within the vehicle cabin HVAC system 600. The fourth input to the control system 100 may be occupant number via an occupant number sensor 140. In some embodiments, the occupant number sensor 140 may be a sensor array with a sensor in each vehicle seat to determine how many seats are occupied. In other embodiments, the occupant number sensor 140 may be a sensor array with a sensor at each door to determine if each door was opened. In the embodiment where the occupant vehicle sensor 140 is a sensor array with a sensor at each door to determine if the door was opened, the number of occupants is assumed to match the number of vehicle doors opened and closed. The fifth input to the control system 100 may be HVAC fan or blower speed via a fan or blower speed sensor 150.

In some embodiments, at least one, some, or all of the five aforementioned sensors provides data to a control module 160. The control module 160 uses a mass balance to determine the amount of water vapor present in the cabin air of the vehicle and adjust the HVAC blower valve 620 via an HVAC blower valve adjustment 170 in order to reduce the amount of water vapor present in the cabin air. This prevents or minimizes condensation from forming on the internal sides of the vehicle windows.

In an embodiment, the control module 160 operates in accordance with Equation 1, shown below.

$$T_{dew\ pt,\ air\ window} < T_{window\ glass} \qquad \text{Equation 1}$$

The control module 160 performs a calculation using a mass balance on the interior volume of the cabin and adjusts the HVAC blower (fan) valve 620 via the HVAC blower valve adjustment 170 to ensure that dew point temperature within the cabin, $T_{dew\ pt,\ air\ window}$, remains less than the temperature of the window glass in the cabin, $T_{window\ glass}$. By keeping the dew point temperature within the cabin lower than the temperature of the window glass, the risk of condensation forming on the window glass is mitigated.

Figure 2:
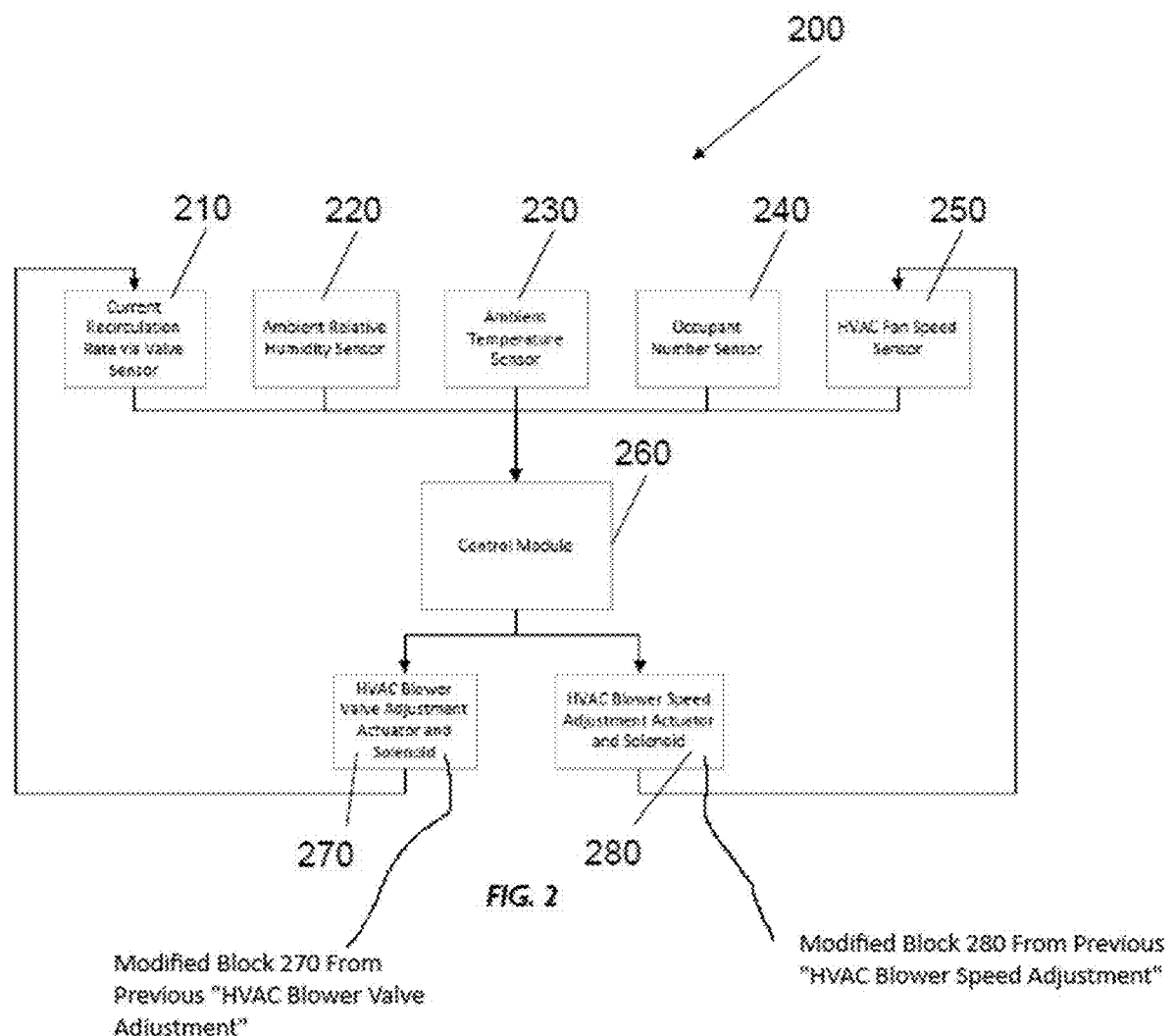
FIG. 2 is a diagrammatic view of a continuous feedback loop control system for adjusting air recirculation by adjusting the HVAC blower valve and HVAC fan speed.

In other embodiments, shown in FIG. 2, a different control system 200 has a number of integrated sensors. These sensors provide inputs to the control system 200 such that the control system 200 can calculate and adjust outputs to optimize battery consumption.

In some embodiments, there are numerous inputs to the control system 200 which are generated from sensors within a vehicle's cabin. The sensors in the vehicle's cabin may be pre-installed with other systems and equipment or may be purposely installed for use with the control system 200 disclosed herein. The first input to the control system 200 may be the current recirculation rate of vehicle cabin air based on a valve angle sensor 210. The valve angle sensor

210 determines the angle of the HVAC blower valve 620 in the HVAC system 600 to determine how much cabin air is recirculated, by percent, and how much fresh air is added (similar to the HVAC blower valve 620 discussed above with respect to the HVAC blower valve 620 used with control system 100). The second input may be ambient relative humidity via an existing ambient relative humidity sensor 220 in the vehicle cabin HVAC system 600. The third input to the control system 200 may be ambient temperature from an ambient temperature sensor 230 located within the vehicle cabin HVAC system 600. The fourth input to the control system 200 may be occupant number via an occupant number sensor 240. In some embodiments, the occupant number sensor 240 may be a sensor array with a sensor in each vehicle seat to determine how many seats are occupied. In other embodiments, the occupant number sensor 240 may be a sensor array with a sensor at each door to determine if each door was opened. In the embodiment where the occupant vehicle sensor 240 is a sensor array with a sensor at each door to determine if the door was opened, the number of occupants is assumed to match the number of vehicle doors opened and closed. The fifth input to the control system 200 may be HVAC fan or blower speed via a fan or blower speed sensor 250.

In some embodiments, one, some, or all of the five aforementioned sensors provides data to a control module 260. The control module 260 uses a mass balance to determine the amount of water vapor present in the cabin air of the vehicle and adjust the HVAC blower valve 620 via an HVAC blower valve adjustment 270 in order to reduce the amount of water vapor present in the cabin air. This prevents condensation from forming on the internal sides of the vehicle windows. The control module 260, in some embodiments, also controls the speed of the HVAC blower 610 via an HVAC blower speed adjustment 280. Adjusting HVAC blower speed via the HVAC blower speed adjustment 280 also prevents condensation from forming on the inside of vehicle windows.

In an embodiment, the control module 260 operates in accordance with Equation 2, shown below.

$$T_{dew\ pt,\ air\ window} < T_{window\ glass} \qquad \text{Equation 2}$$

The control module 260 performs a calculation using a mass balance on the interior volume of the cabin and adjusts the HVAC blower valve 620 via the HVAC blower valve adjustment 270 or HVAC blower speed adjustment 280 to ensure that dew point temperature within the cabin, $T_{dew\ pt,\ air\ window}$, remains less than the temperature of the window glass in the cabin, $T_{window\ glass}$. $T_{window\ glass}$ is a function of vehicle speed, ambient temperature, blower speed, amount of air exiting the HVAC system, and the temperature of the air exiting the HVAC system. In some embodiments, it may be approximately 1-2° C. greater than the ambient temperature during transient conditions and 3-7° C. above the ambient temperature during steady state conditions. By keeping the dew point temperature within the passenger cabin lower than the temperature of the window glass, the risk of condensation forming on the window glass is mitigated.

Figure 3:
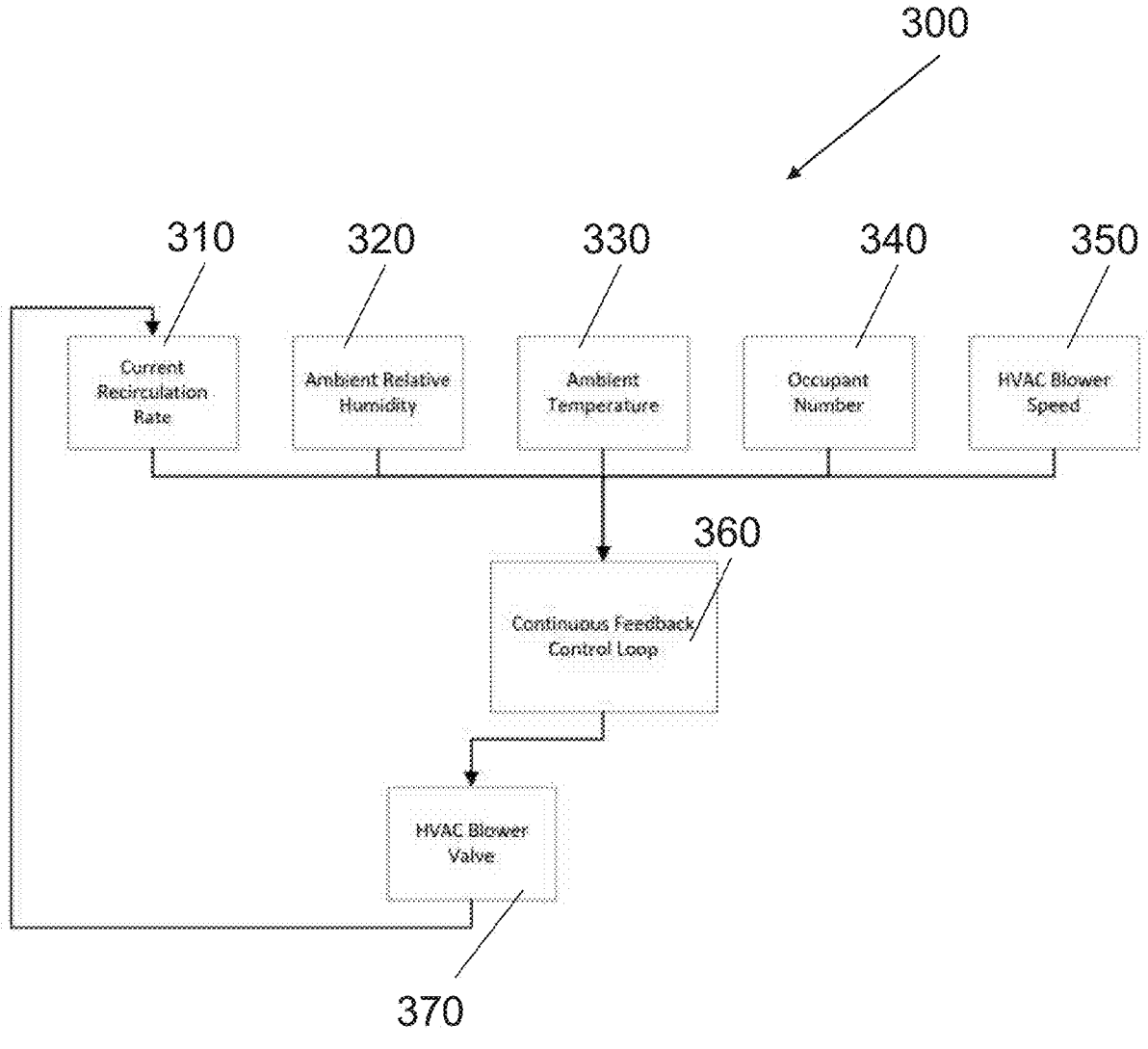
FIG. 3 is a schematic view of sensor inputs to a control system with a single output.

Turning to FIG. 3, a schematic representation of another control method 300 that may be used by the control module 160 is shown. The control method 300 has five inputs: recirculation rate 310, ambient relative humidity 320 within the passenger cabin, ambient temperature 330 within the passenger cabin, occupant number 340 within the passenger cabin, and HVAC blower speed 350. The recirculation rate 310 consists of the percentage of passenger cabin air that recirculates through the fan for a given time divided by the total volume of air circulating through the fan 610. The recirculation rate 310, ambient relative humidity 320, ambient temperature 330, occupant number 340, and HVAC blower speed 350 feed into a continuous feedback control loop 360. The continuous feedback control loop 360 calculates a mass balance on the interior volume of a passenger compartment of a vehicle and outputs a HVAC blower valve angle 370 in accordance with Equation 3.

$$\frac{d\omega_{cabin}}{dt} V_{air,cabin} \, \rho_{air} = \omega_{air,in} \dot{m}_{air,in} + \dot{m}_{w,gen} - \omega_{cabin} \dot{m}_{air,out} \qquad \text{Equation 3}$$

The continuous feedback control loop 360 monitors the change in the amount of water vapor present in the cabin of the vehicle, $$\frac{d\omega_{cabin}}{dt} V_{air,cabin} \, \rho_{air}.$$

This is affected by the flow rate of water vapor into the cabin of the vehicle, $\omega_{air,in} \dot{m}_{air,in}$ from external air. $\dot{m}_{air,in}$ is the mass flow rate of air flowing into the vehicle cabin. $\omega_{air,in}$ is the specific humidity of the air flowing into the vehicle cabin. Multiplying the mass flow rate of air into the vehicle cabin with the specific humidity of the air flowing into the vehicle cabin yields the mass flow rate of water flowing into the vehicle cabin. The continuous feedback control loop 360 sums the flow rate of water vapor into the cabin of the vehicle from external air with the amount water vapor generated by the occupants of the cabin, $\omega_{air,in} \dot{m}_{air,in} +$ $\dot{m}_{w,gen}$. The continuous feedback control loop 360 further adjusts the flow rate of water vapor out of the cabin of the vehicle, $\omega_{cabin} \dot{m}_{air,out}$, by adjusting the HVAC blower valve angle 370. $\dot{m}_{w,gen}$ is the mass flow rate of water vapor into the vehicle cabin generated by the occupants of the vehicle. $\omega_{cabin}$ is the specific humidity of the cabin air. $\dot{m}_{air,out}$ is the mass flow rate of air exiting the vehicle cabin. Multiplying these two variables together gives the amount of water vapor flowing out of the cabin of the vehicle.

The HVAC blower valve angle 370 changes the recirculation rate 310 of air in the interior volume of the vehicle based on the mass balance performed by the continuous feedback control loop 360 according to Equation 3. By continually performing a mass balance on the interior volume of the vehicle and adjusting the HVAC blower valve 620 to optimize the recirculation rate 310 (i.e. to change between one of the three options discussed above with respect to the valve (110, above), and modifying the ratio of (iii), above to a desired ratio), battery consumption is reduced because the minimum amount of fresh air is injected into the cabin, which requires a minimum amount of heat to be produced to heat up the fresh air that is introduced into the passenger cabin to a suitable temperature. Heat may be inputted in electric vehicles via several methods, such as resistive heating, heat pump systems, and the like, which each require electrical power from the vehicle's batter to operate (i.e. to operate the resistive heater, or to operate a compressor to cause the heat pump system to operate as needed). Therefore, reducing the amount of heat needed improves battery life for a given charge level and vehicle range in electric vehicles.

Figure 4:
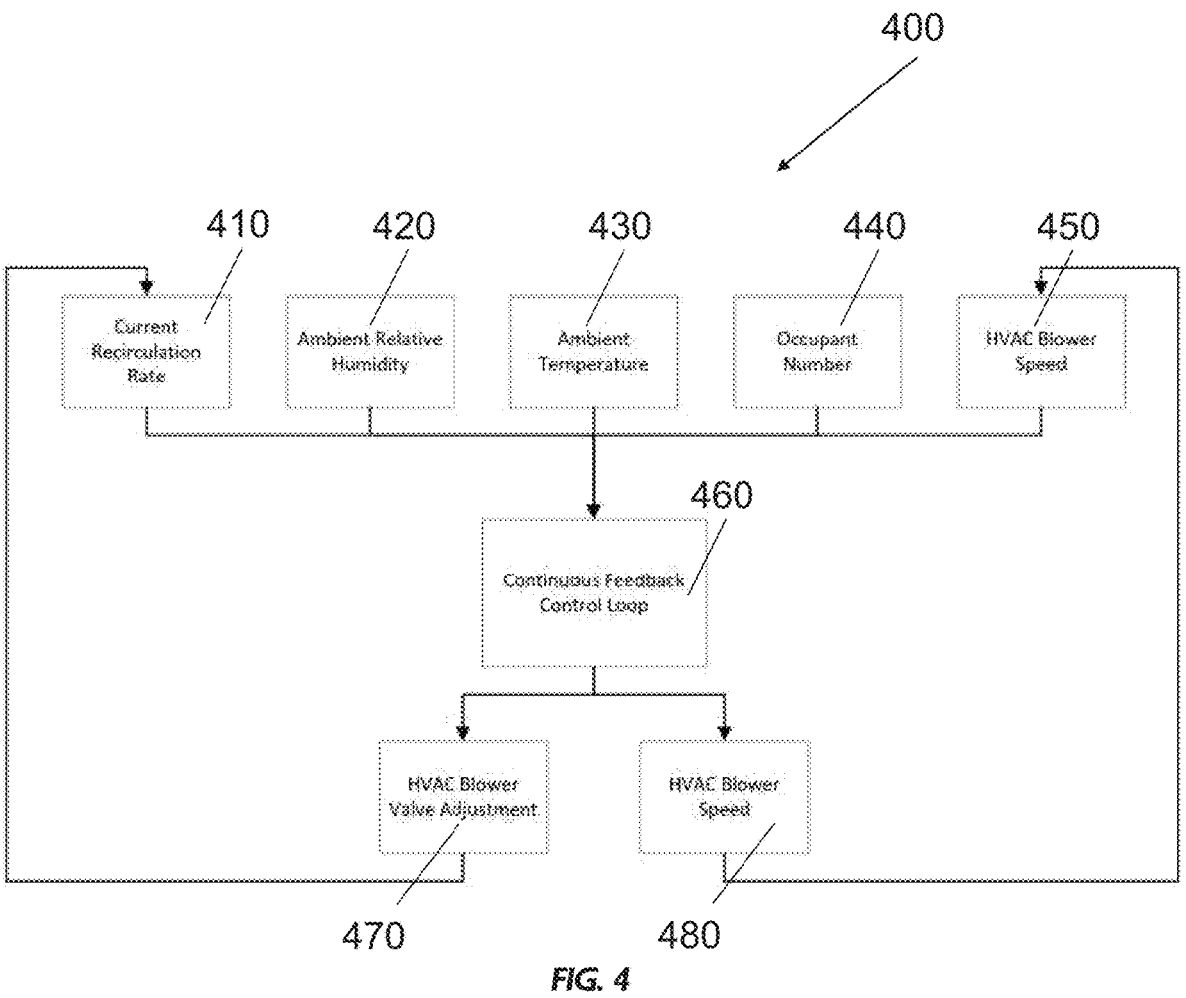
FIG. 4 is a is a schematic view of sensor inputs to a control system with dual outputs.

Turning to FIG. 4, a schematic representation of an alternate control method 400 that used by the control module 260 is provided.

The control method 400 has five inputs: recirculation rate 410 (similar to recirculation rate 310 discussed above), passenger cabin ambient relative humidity 420, passenger cabin ambient temperature 430, passenger cabin occupant number 440, and HVAC blower speed 450. The recirculation rate 410, ambient relative humidity 420, ambient temperature 430, occupant number 440, and HVAC blower speed 450 feed into a continuous feedback control loop 460. The continuous feedback control loop 460 calculates a mass balance on the interior volume of a vehicle and outputs a HVAC blower valve angle 470. The continuous feedback control loop 460 calculates a mass balance on the interior volume of a vehicle and outputs a HVAC blower valve angle 470 in accordance with Equation 4.

$$\frac{d\omega_{cabin}}{dt} V_{air,cabin} \, \rho_{air} = \omega_{air,in} \dot{m}_{air,in} + \dot{m}_{w,gen} - \omega_{cabin} \dot{m}_{air,out} \qquad \text{Equation 4}$$

The continuous feedback control loop 460 monitors the change in the amount of water vapor present in the cabin of the vehicle, $$\frac{d\omega_{cabin}}{dt} V_{air,cabin} \, \rho_{air}.$$

This is affected by the flow rate of water vapor into the cabin of the vehicle, $\omega_{air,in} \dot{m}_{air,in}$ from external air. $\dot{m}_{air,in}$ is the mass flow rate of air flowing into the vehicle cabin. $\omega_{air,in}$ is the specific humidity of the air flowing into the vehicle cabin. Multiplying the mass flow rate of air into the vehicle cabin with the specific humidity of the air flowing into the vehicle cabin yields the mass flow rate of water flowing into the vehicle cabin. The continuous feedback control loop 460 sums the flow rate of water vapor into the cabin of the vehicle from external air with the amount water vapor generated by the occupants of the cabin, $\omega_{air,in} \dot{m}_{air,in} +$ $\dot{m}_{w,gen}$. $\dot{m}_{w,gen}$ is the mass flow rate of water vapor into the vehicle cabin generated by the occupants of the vehicle. The continuous feedback control loop 460 further adjusts the flow rate of water vapor out of the cabin of the vehicle, $\omega_{cabin} \dot{m}_{air,out}$, by adjusting the HVAC blower valve angle 470 (to adjust between the settings (i), (ii), and (iii) as discussed above—and specifically the ratio of cabin air to fresh air (iii)) and HVAC blower speed 480. $\omega_{cabin}$ is the specific humidity of the cabin air. $\dot{m}_{air,out}$ is the mass flow rate of air exiting the vehicle cabin. Multiplying these two variables together gives the amount of water vapor flowing out of the cabin of the vehicle.

The HVAC blower valve 620 changes the recirculation rate 410 of air in the interior volume of the vehicle based on the mass balance performed by the continuous feedback control loop 460. Additionally, the continuous feedback loop 460 also outputs an HVAC blower speed 480. By continually performing a mass balance in accordance with Equation 4 on the interior volume of the vehicle and adjusting the HVAC blower valve angle 470 and HVAC blower speed 480 to optimize the recirculation rate 410, battery consumption is reduced because the minimum amount of fresh air is injected into the cabin, which requires a minimum amount of heat to be produced to heat up the fresh air that is introduced into the passenger cabin to a suitable temperature, which ultimately requires power from the battery as discussed above.

Figure 5:
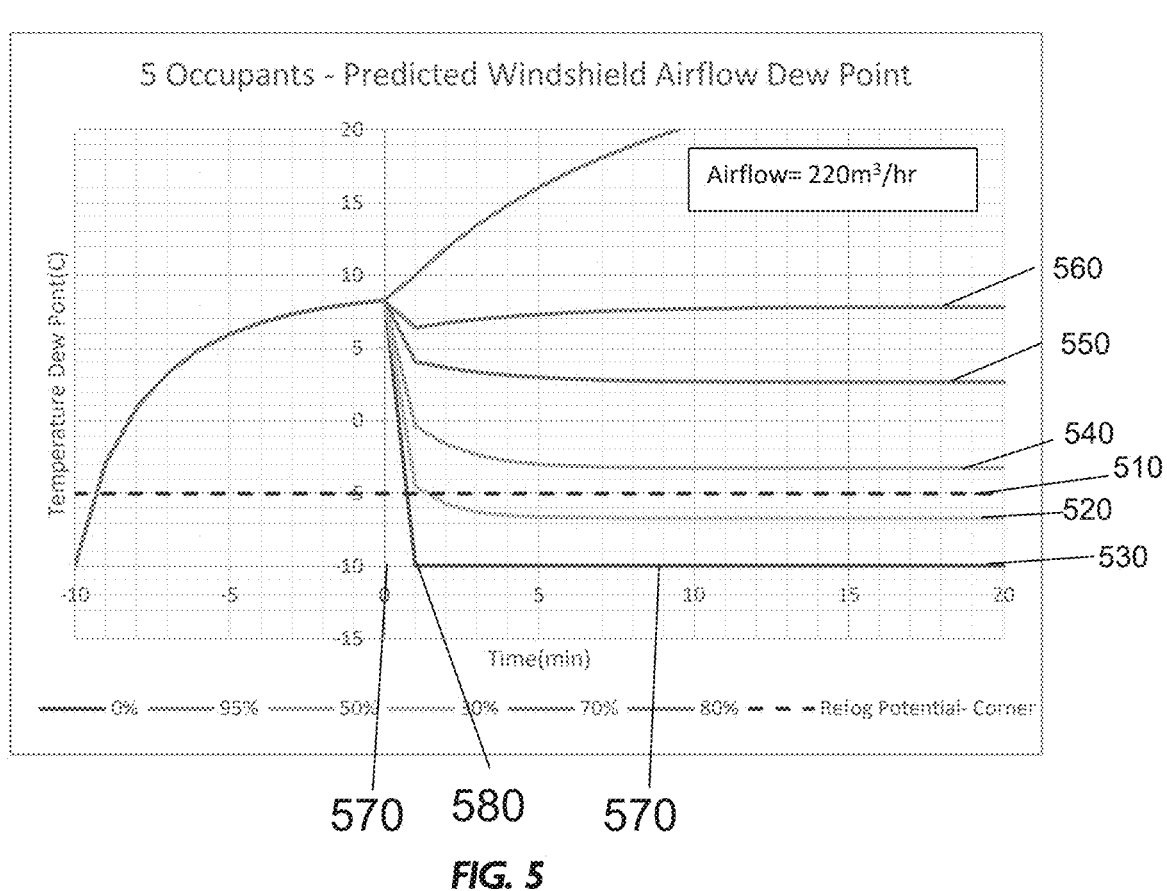
FIG. 5 is a graphical depiction showing how adjustment of the percent of recirculated air affects dew point in a vehicle cabin.

A graphical depiction showing how adjustment of the percent of recirculated air affects dew point in a vehicle cabin is shown in FIG. 5. The graphical depiction 500 shows the potential for condensation to form as a function of the percent of recirculated air in the cabin. The dew point limit 510 illustrates the temperature at which condensation will begin to form on the interior surface of the windows. The actual dew point temperature of the interior air is shown as a function of the recirculation rate of cabin air. Recirculating more water vapor-laden cabin air causes the actual dew point temperature of the interior air to decrease. A representative charting of how the control module modulates the water vapor within the cabin, a number of different recirculation rates are shown. Line 530 is associated with circulating 30% fresh air in the recirculating air and Line 520 is associated with circulating 0% fresh air in the recirculating air. Lines 520 and 530 fall below the dew point limit, which means there is a high likelihood of water vapor accumulation on the interior surfaces of the windows. Enough fresh air must be circulated through the system to prevent the water vapor accumulating within the cabin to fall below the dew point limit 510 which will cause condensation to form on interior window surfaces.

Line 540 is associated with circulating 50% fresh air in the recirculating air. Line 550 is associated with circulating 70% fresh air in the recirculating air. Line 560 is associated with circulating 80% fresh air in the recirculating air. These lines are further from the dew point limit 510 so there is no danger of water vapor forming condensation on the interior window surfaces, however, more fresh air requires more heating from the vehicle to heat the fresh air to cabin temperature. Therefore, optimization is needed to bring lines 520-560 as close to the dew point limit 510 as possible without reaching the dew point limit 510 to minimize battery life while preventing condensation from forming. The control method 300 of FIG. 3 is used to optimize this relationship. By performing a mass balance on the interior of the vehicle, the control method 300 actuates the control system 160 to increase the amount of recirculated air without reaching the dew point limit 510. The mass balance performed by the control method 300 of the control system 160 continually adjusts HVAC blower valve 620 via the HVAC blower valve adjustment 170 to ensure that dew point temperature within the cabin, $T_{dew\ pt,\ air\ window}$, remains less than the temperature of the window glass in the cabin, $T_{window\ glass}$. $T_{window\ glass}$ is a function of vehicle speed, ambient temperature, blower speed, amount of air exiting the HVAC system, and the temperature of the air exiting the HVAC system. In some embodiments, it may be approximately 1-2° C. greater than the ambient temperature during transient conditions and 3-7° C. above the ambient temperature during steady state conditions. In the graphical depiction 500, this is illustrated by the control method 300 actuating the control system 160 to continually adjust the HVAC blower valve 620 via the HVAC blower valve adjustment 170 to recirculate air. At Time=0 (570), the vehicle is started. At Time=0+ (580) the control module has been actuated and is continually determining the $T_{dew\ pt,\ air\ window}$ and $T_{window\ glass}$. The control method 300 is monitoring the dew point limit 510 and adjusting the recirculation rate via the recirculation valve to increase the amount of recirculated air to bring lines 520-560 as close to the dew point limit 510 as possible without exceeding the dew point limit 510. By maximizing the amount of recirculated air, the control method 300 inputs as little fresh air as feasible which reduces the amount of heating needed (since the amount of heating needed is directly related to the amount of fresh air inputted into the cabin), the control module optimizes battery consumption due to minimizing heating demands.

Figure 6:
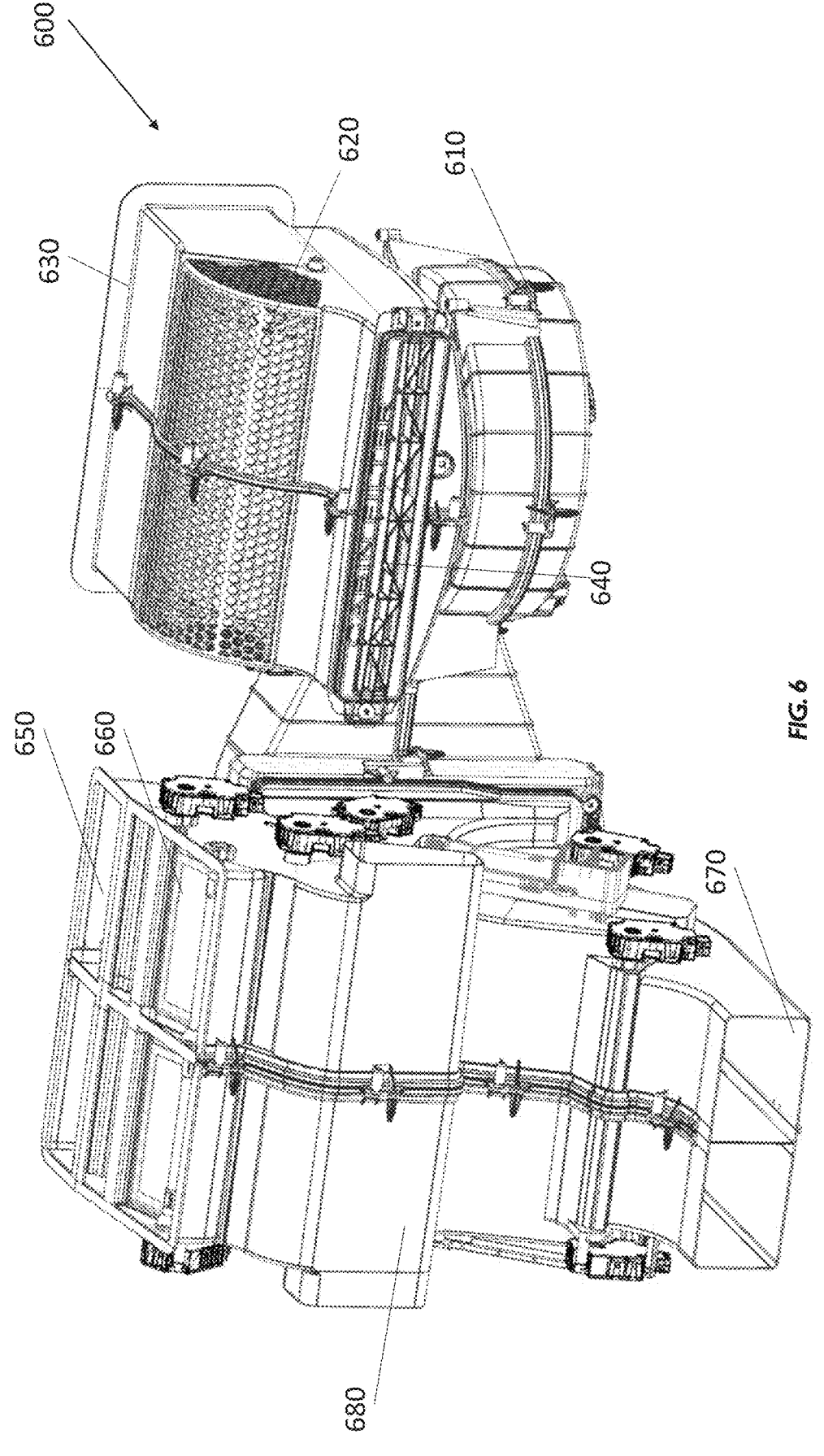
FIG. 6 is a perspective view of a vehicle HVAC system.
Figure 7:
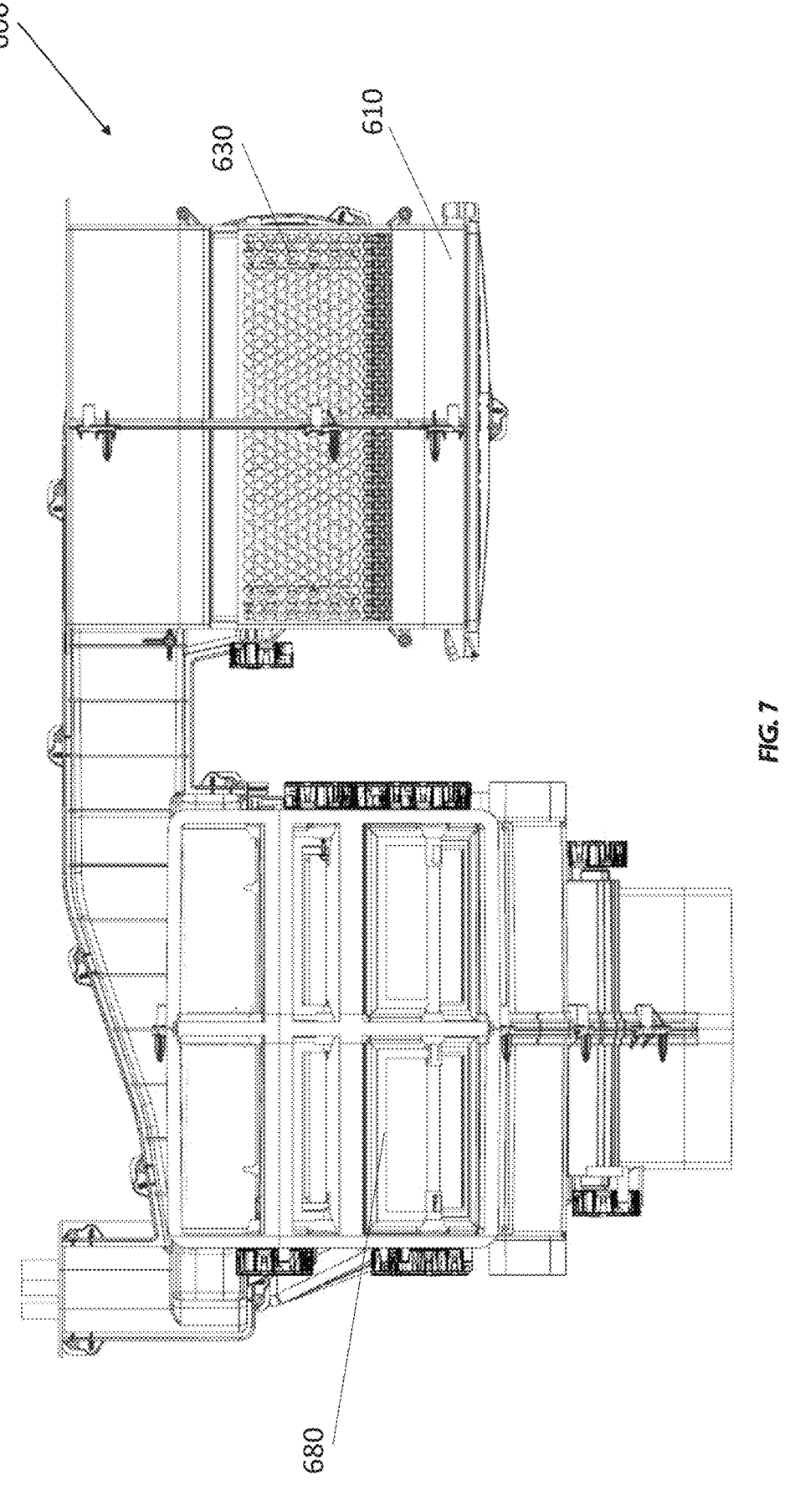
FIG. 7 is a front view of the vehicle HVAC system of FIG. 6.
Figure 8:
FIG. 8 is a side view of the vehicle HVAC system of FIG. 6.

Turning next to FIGS. 6-8, the full HVAC system 600 is shown. The HVAC system 600 consists of the control system 100, 200 (not shown in FIG. 6), the fan 610, and a series of intakes and vents. External air from outside the vehicle is drawn to the HVAC system 600 via an outside air intake 630 by the fan 610. Conditioned vehicle air is drawn to the HVAC system 600 via a recirculation intake 640 by the fan 610. HVAC blower valve 620 is adjusted by the mass balance performed by the control system 100, 200 to optimize the battery usage by limiting the amount of external air drawn in to the HVAC system 600 by the outside air intake 630. The HVAC system 600 further comprises three vents: a rear seat vent 670, a front seat vent 660, and an defog vent 650. The air from the fan 610 is pushed through the rear seat vent 670, a front seat vent 660, and an defog vent 650 to be circulated throughout the vehicle cabin. There is a valve system 680 which controls the distribution of air throughout the cabin of the vehicle.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims.

The specification can be best understood with reference to the following Numbered Paragraphs:

Numbered Paragraphs 1: An HVAC system for a vehicle, comprising:

a first air input configured to receive air from a passenger compartment of a vehicle where the HVAC system is disposed, a second air input configured to receive air from outside of the vehicle, a fan with a suction that is configured to receive air from the first air input and the second air input, and a valve positioned upstream of the suction for the fan, the valve operable to allow either (i) air only from the first air input, (ii) air only from the second air input, or (iii) air from both the first air input and the second air input, wherein a position of the valve can be modified to alter relative percentages of air from the first and second inputs that reaches the suction of the fan, an air cooling device that air from a discharge of the fan can flow therepast, an air heating device that air from the discharge of the fan can flow therepast, and a plurality of air outlet flowpaths that direct air from the HVAC system to various specific locations within the vehicle; and a control module configured to control vehicle cabin humidity, the control module comprising:

at least one sensor that monitors for a parameter within a vehicle passenger compartment, or a parameter of an environment surrounding the vehicle passenger compartment, at least one valve upstream of the fan, and at least one control module, wherein the control module causes operation of the at least one actuator based upon an output of the at least one sensor.

Numbered Paragraph 2: The control module configured to control vehicle cabin humidity of Numbered Paragraph 1, wherein the at least one sensor further comprises a valve angle sensor.

Numbered Paragraph 3: The control module configured to control vehicle cabin humidity of either of Numbered Paragraphs 1 or 2, wherein the at least one sensor further comprises, a valve angle sensor and an ambient relative humidity sensor.

Numbered Paragraph 4: The control module configured to control vehicle cabin humidity of any one of Numbered Paragraphs 1-3, wherein the at least one sensor further comprises, a valve angle sensor, an ambient relative humidity sensor, and an ambient temperature sensor.

Numbered Paragraph 5: The control module configured to control vehicle cabin humidity of any one of Numbered Paragraphs 1-4, wherein the at least one sensor further comprises, a valve angle sensor, an ambient relative humidity sensor, an ambient temperature sensor, and an occupant number sensor.

Numbered Paragraph 6: The control module configured to control vehicle cabin humidity of any one of Numbered Paragraphs 1-5, wherein the at least one sensor further comprises, a valve angle sensor, an ambient relative humidity sensor, an ambient temperature sensor, an occupant number sensor, and a fan speed sensor.

Numbered Paragraph 7: The control module configured to control vehicle cabin humidity of any one of Numbered Paragraphs 1-6, wherein the at least one actuator comprises an actuator configured to adjust a heating system blower recirculation valve.

Numbered Paragraph 8: The control module configured to control vehicle cabin humidity of any one of Numbered Paragraphs 1-7, wherein the at least one actuator further comprises an actuator configured to adjust a heating system fan speed.

Numbered Paragraph 9: The control module configured to control vehicle cabin humidity of any one of Numbered Paragraphs 1-8, wherein the at least on control module performs a mass balance and actuates at least one actuator in accordance with the following equation:

$$\frac{d\omega_{cabin}}{dt}V_{air,cabin}\,\rho_{air} = \omega_{air,in}\dot{m}_{air,in} + \dot{m}_{w,gen} - \omega_{cabin}\dot{m}_{air,out}$$

where $$\frac{d\omega_{cabin}}{dt}V_{air,cabin}\,\rho_{air}$$

is the amount of accumulated water vapor in the vehicle cabin;

$\dot{m}_{air,in}$ is the mass flow rate of air flowing into the vehicle cabin;

$\omega_{air,in}$ is the specific humidity of the air flowing into the vehicle cabin;

$\dot{m}_{w,gen}$ is the mass flow rate of water vapor into the vehicle cabin generated by the occupants of the vehicle;

$\omega_{cabin}$ is the specific humidity of the cabin air;

$\dot{m}_{air,out}$ is the mass flow rate of air exiting the vehicle cabin;

such that the following relationship is maintained in the vehicle cabin:

$$T_{dew\ pt,\ air\ window} < T_{window\ glass};$$

wherein $T_{dew\ pt,\ air\ window}$ is dew point temperature in the vehicle cabin; and $T_{window\ glass}$ is window glass temperature in the vehicle cabin.

Numbered Paragraph 10: A method for controlling vehicle cabin humidity, the method comprising:

sensing at least one bulk property condition within a vehicle cabin, performing a mass balance based on the sensed bulk property condition within the vehicle cabin, in response to the mass balance, actuating at least one solenoid in a heating system to divert more air into the vehicle cabin, and optionally, in response to the mass balance, actuating at least one solenoid in a heating system to increase blower speed within the heating system of vehicle cabin.

Numbered Paragraph 11: The method for controlling vehicle cabin humidity of Numbered Paragraph 10, wherein performing a mass balance based on the sensed bulk property condition within the vehicle cabin performs the mass balance in accordance with the following equation:

$$\frac{d\omega_{cabin}}{dt}V_{air,cabin}\,\rho_{air} = \omega_{air,in}\dot{m}_{air,in} + \dot{m}_{w,gen} - \omega_{cabin}\dot{m}_{air,out}$$

wherein $$\frac{d\omega_{cabin}}{dt}V_{air,cabin}\,\rho_{air}$$

is the amount of accumulated water vapor in the vehicle cabin;

$\dot{m}_{air,in}$ is the mass flow rate of air flowing into the vehicle cabin;

$\omega_{air,in}$ is the specific humidity of the air flowing into the vehicle cabin;

$\dot{m}_{w,gen}$ is the mass flow rate of water vapor into the vehicle cabin generated by the occupants of the vehicle;

$\omega_{cabin}$ is the specific humidity of the cabin air;

$\dot{m}_{air,out}$ is the mass flow rate of air exiting the vehicle cabin;

such that the following relationship is maintained in the vehicle cabin:

$$T_{dew\ pt,\ air\ window} < T_{window\ glass};$$

wherein $T_{dew\ pt,\ air\ window}$ is dew point temperature in the vehicle cabin; and $T_{window\ glass}$ is window glass temperature in the vehicle cabin.

Numbered Paragraph 12: The method for controlling vehicle cabin humidity of any one of Numbered Paragraphs 10 or 11, wherein the at least one bulk property sensed is selected from the following: recirculation rate, ambient relative humidity, ambient temperature, occupant number, and fan speed.

Numbered Paragraph 13: The method for controlling vehicle cabin humidity of any one of Numbered Paragraphs 10-12, wherein the at least one bulk property sensed further comprises at least two bulk properties sensed.

Numbered Paragraph 14: A system for controlling cabin humidity, the system comprising:

a first air input configured to receive air from a passenger compartment of a vehicle where the HVAC system is disposed, a second air input configured to receive air from outside of the vehicle, a fan with a suction that is
configured to receive air from the first air input and the
second air input, and a valve positioned upstream of the
suction for the fan, the valve operable to allow either (i)
air only from the first air input, (ii) air only from the
second air input, or (iii) air from both the first air input
and the second air input, wherein a position of the valve
can be modified to alter relative percentages of air from
the first and second inputs that reaches the suction of
the fan, an air cooling device that air from a discharge
of the fan can flow therepast, an air heating device that
air from the discharge of the fan can flow therepast, and
a plurality of air outlet flowpaths that direct air from the
HVAC system to various specific locations within the
vehicle; and a control module, wherein the control
module performs the following:
  sensing at least one bulk property condition within a
    vehicle cabin,
  performing a mass balance based on the sensed bulk
    property condition within the vehicle cabin,
  in response to the mass balance, actuating a valve
    within the HVAC system to adjust an amount of air
    that is allowed to flow into the vehicle cabin, and
  optionally, in response to the mass balance, actuating
    increasing blower speed within the heating system of
    vehicle cabin.
Numbered Paragraph 15: The system for controlling cabin
humidity of Numbered Paragraph 14, wherein performing a
mass balance based on the sensed bulk property condition
within the vehicle cabin performs the mass balance in
accordance with the following equation:

$$\frac{d\omega_{cabin}}{dt} V_{air,cabin}\,\rho_{air} = \omega_{air,in}\dot{m}_{air,in} + \dot{m}_{w,gen} - \omega_{cabin}\dot{m}_{air,out}$$

wherein $$\frac{d\omega_{cabin}}{dt} V_{air,cabin}\,\rho_{air}$$

is the amount of accumulated water vapor in the vehicle
    cabin;
  $\dot{m}_{air,in}$ is the mass flow rate of air flowing into the vehicle
    cabin;
  $\omega_{air,in}$ is the specific humidity of the air flowing into the
    vehicle cabin;
  $\dot{m}_{w,gen}$ is the mass flow rate of water vapor into the vehicle
    cabin generated by the occupants of the vehicle;
  $\omega_{cabin}$ is the specific humidity of the cabin air;
  $\dot{m}_{air,out}$ is the mass flow rate of air exiting the vehicle
    cabin;
  such that the following relationship is maintained in the
    vehicle cabin:

$T_{dew\,pt,\,air\,window} < T_{window\,glass};$ wherein $T_{dew\,pt,\,air\,window}$ is dew point temperature in the
    vehicle cabin; and
  $T_{window\,glass}$ is window glass temperature in the vehicle
    cabin.
The invention claimed is:
1. A heating, ventilation, and air conditioning system for
a vehicle in motion, comprising:
  a first air input configured to receive air from a passenger
    compartment of a vehicle where the heating, ventila-
    tion, and air conditioning system is disposed, a second air input configured to receive air from outside
    of the vehicle, a fan with a suction that is configured to
    receive air from the first air input and the second air
    input, and
  a valve positioned upstream of the suction for the fan, the
    valve operable to allow either (i) air only from the first
    air input, (ii) air only from the second air input, or (iii)
    air from both the first air input and the second air input,
    wherein a position of the valve can be modified to alter
    relative percentages of air from the first and second
    inputs that reaches the suction of the fan,
  an air cooler that air from a discharge of the fan can flow
    therepast,
  an air heater that air from the discharge of the fan can flow
    therepast, and a plurality of air outlet flowpaths that
    direct air from the heating, ventilation, and air condi-
    tioning system to various specific locations within the
    vehicle; and
  a controller configured to control humidity in a vehicle
    cabin, the controller comprising:
at least one sensor that monitors for a parameter within a
vehicle passenger compartment, or a parameter of an envi-
ronment surrounding the vehicle passenger compartment,
and
  wherein the controller causes operation of at least one
    actuator based upon an output of the at least one sensor,
  wherein the controller continuously performs a mass
    balance to determine the amount of accumulated water
    vapor in the passenger compartment of a vehicle based
    on the first air input, the second air input, and the sensor
    output, wherein the controller performs a mass balance
    based on the first air input, the second air input, and the
    sensor output within the vehicle cabin in accordance
    with the following equation:

$$\frac{d\omega_{cabin}}{dt} V_{air,cabin}\,\rho_{air} = \omega_{air,in}\dot{m}_{air,in} + \dot{m}_{w,gen} - \omega_{cabin}\dot{m}_{air,out},$$

wherein $$\frac{d\omega_{cabin}}{dt} V_{air,cabin}\,\rho_{air}$$

is a rate of change of the amount of accumulated water
    vapor in the vehicle cabin;
  $\dot{m}_{air,in}$ is a mass flow rate of air flowing into the vehicle
    cabin;
  $\omega_{air,in}$ is a specific humidity of the air flowing into the
    vehicle cabin;
  $\omega_{air,in}\dot{m}_{air,in}$ is a variable amount of water vapor entering
    the vehicle cabin from the exterior of the vehicle,
  $\dot{m}_{w,gen}$ is a mass flow rate of water vapor into the vehicle
    cabin generated by the occupants of the vehicle;
  $\omega_{cabin}$ is a specific humidity of air within the vehicle
    cabin;
  $\dot{m}_{air,out}$ is the mass flow rate of air exiting the vehicle
    cabin;
  wherein the position of the valve is modified by the
    controller to alter relative percentages of air from the
    first and second inputs that reaches the suction of the
    fan reducing or increasing relative percentages of air
    from the first and second inputs that reaches the suction
    of the fan such that the following relationship is maintained in the vehicle cabin:

$$T_{dew\ pt,air\ window} < T_{window\ glass};$$

wherein $T_{dew\ pt,air\ window}$ is a dew point temperature in the vehicle cabin, $T_{window\ glass}$ is a window glass temperature in the vehicle cabin, and
wherein $$\frac{d\omega_{cabin}}{dt} V_{air,cabin}\, \rho_{air}$$

is minimized through continuous optimization of the mass balance based on at least the value of $\omega_{air,in}\dot{m}_{air,in}$ as it varies while the vehicle is in motion.

2. The heating, ventilation, and air conditioning system for a vehicle of claim 1, wherein the at least one sensor further comprises a valve angle sensor.

3. The heating, ventilation, and air conditioning system for a vehicle of claim 1, wherein the at least one sensor further comprises a valve angle sensor and an ambient relative humidity sensor.

4. The heating, ventilation, and air conditioning system for a vehicle of claim 1, wherein the at least one sensor further comprises a valve angle sensor, an ambient relative humidity sensor, and an ambient temperature sensor.

5. The heating, ventilation, and air conditioning system for a vehicle of claim 1, wherein the at least one sensor further comprises a valve angle sensor, an ambient relative humidity sensor, an ambient temperature sensor, and an occupant number sensor.

6. The heating, ventilation, and air conditioning system for a vehicle of claim 1, wherein the at least one sensor further comprises a valve angle sensor, an ambient relative humidity sensor, an ambient temperature sensor, an occupant number sensor, and a fan speed sensor.

7. The heating, ventilation, and air conditioning system for a vehicle of claim 1, wherein the at least one actuator comprises an actuator configured to adjust a heating system blower recirculation valve.

8. The heating, ventilation, and air conditioning system for a vehicle of claim 1, wherein the at least one actuator comprises an actuator configured to adjust a heating system fan speed.

9. A method for controlling vehicle cabin humidity for a vehicle in motion, the method comprising:

sensing at least one bulk property condition within a vehicle cabin,
sensing the current blower speed of the blower in a heating system,
performing a mass balance based on the sensed bulk property condition within the vehicle cabin,
in response to the mass balance, actuating at least one solenoid in a heating system to divert more air into the vehicle cabin, and
in response to the mass balance, actuating at least one solenoid in the heating system to increase or decrease blower speed within the heating system of the vehicle cabin,
wherein performing a mass balance based on the sensed bulk property condition within the vehicle cabin performs the mass balance in accordance with the following equation:

$$\frac{d\omega_{cabin}}{dt} V_{air,cabin}\, \rho_{air} = \omega_{air,in}\dot{m}_{air,in} + \dot{m}_{w,gen} - \omega_{cabin}\dot{m}_{air,out}$$

wherein $$\frac{d\omega_{cabin}}{dt} V_{air,cabin}\, \rho_{air}$$

is a rate of change of the amount of accumulated water vapor in the vehicle cabin;

$\dot{m}_{air,in}$ is a mass flow rate of air flowing into the vehicle cabin;

$\omega_{air,in}$ is a specific humidity of the air flowing into the vehicle cabin;

$\dot{m}_{w,gen}$ is a mass flow rate of water vapor into the vehicle cabin generated by the occupants of the vehicle;

$\omega_{cabin}$ is a specific humidity of air within the vehicle cabin;

$\dot{m}_{air,out}$ is a mass flow rate of air exiting the vehicle cabin;

actuating at least one solenoid in a heating system to divert more or less air into the vehicle cabin in response to the sensed bulk property condition and the mass balance such that the following relationship is maintained in the vehicle cabin:

$$T_{dew\ pt,air\ window} < T_{window\ glass};$$

wherein $T_{dew\ pt,air\ window}$ is a dew point temperature in the vehicle cabin; and $T_{window\ glass}$ is a window glass temperature in the vehicle cabin, and
wherein $$\frac{d\omega_{cabin}}{dt} = V_{air,cabin}\rho_{air}$$

is minimized through continuous optimization of the mass balance based on at least the value of $\omega_{air,in}\dot{m}_{air,in}$ as it varies while the vehicle is in motion.

10. The method for controlling vehicle cabin humidity of claim 9, wherein the at least one bulk property sensed is selected from the following: recirculation rate, ambient relative humidity, ambient temperature, occupant number, and fan speed.

11. The method for controlling vehicle cabin humidity of claim 9, wherein the at least one bulk property sensed further comprises at least two bulk properties sensed.

12. A system for controlling cabin humidity for a vehicle in motion, the system comprising:

a first air input configured to receive air from a passenger compartment of a vehicle where a heating, ventilation, and air conditioning system is disposed, a second air input configured to receive air from outside of the vehicle, a fan with a suction that is configured to receive air from the first air input and the second air input, and a valve positioned upstream of the suction for the fan, the valve operable to allow either (i) air only from the first air input, (ii) air only from the second air input, or (iii) air from both the first air input and the second air input, wherein a position of the valve can be modified to alter relative percentages of air from the first and second inputs that reaches the suction of the fan, an air cooler that air from a discharge of the fan can flow therepast, an air heater that air from the discharge of the fan can flow therepast, and a plurality of air outlet flowpaths that direct air from the heating, ventilation, and air conditioning system to various specific locations within the vehicle; and a controller, wherein the controller performs the following:

sensing at least one bulk property condition within a vehicle cabin, performing a mass balance based on the sensed bulk property condition within the vehicle cabin, in response to the mass balance, actuating the valve positioned upstream of the suction for the fan within the heating, ventilation, and air conditioning system to adjust an amount of air that is allowed to flow into the vehicle cabin, and in response to the mass balance, actuating increasing blower speed within the heating system of the vehicle cabin, wherein performing a mass balance based on the sensed bulk property condition within the vehicle cabin performs the mass balance in accordance with the following equation:

$$\frac{d\omega_{cabin}}{dt} V_{air,cabin}\, \rho_{air} = \omega_{air,in}\dot{m}_{air,in} + \dot{m}_{w,gen} - \omega_{cabin}\dot{m}_{air,out}$$

wherein $$\frac{d\omega_{cabin}}{dt} V_{air,cabin}\rho_{air}$$

18 is a rate of change of the amount of accumulated water vapor in the vehicle cabin;

$\dot{m}_{air,in}$ is a mass flow rate of air flowing into the vehicle cabin;

$\omega_{air,in}$ is a specific humidity of the air flowing into the vehicle cabin;

$\dot{m}_{w,gen}$ is a mass flow rate of water vapor into the vehicle cabin generated by the occupants of the vehicle;

$\omega_{cabin}$ is a specific humidity of air within the vehicle cabin;

$\dot{m}_{air,out}$ is a mass flow rate of air exiting the vehicle cabin;

actuating at least one solenoid in a heating system to divert more or less air into the vehicle cabin in response to the sensed bulk property condition and the mass balance such that the following relationship is maintained in the vehicle cabin:

$$T_{dew\ pt,\ air\ window} < T_{window\ glass};$$

wherein $T_{dew\ pt,\ air\ window}$ is a dew point temperature in the vehicle cabin; and $T_{window\ glass}$ is a window glass temperature in the vehicle cabin, and wherein $$\frac{d\omega_{cabin}}{dt} V_{air,cabin}\rho_{air}$$

is minimized through continuous optimization of the mass balance based on at least the value of $\omega_{air,in}\dot{m}_{air,in}$ as it varies while the vehicle is in motion.

*  *  *  *  *